July 6, 1965  A. M. KING  3,193,144
WATER HEATING TANK
Filed Aug. 14, 1963  2 Sheets-Sheet 1
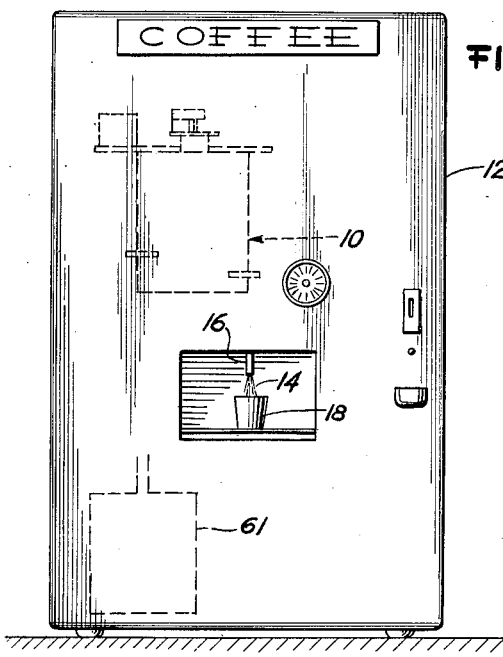
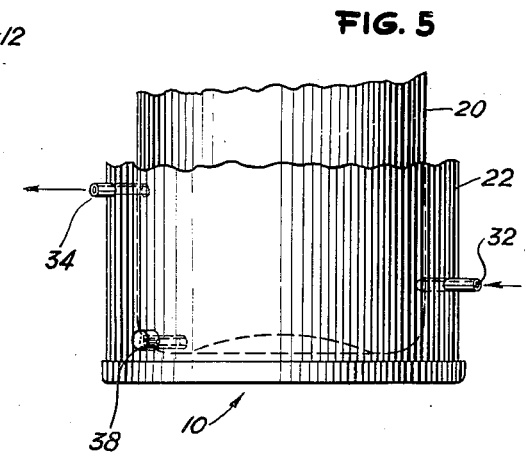
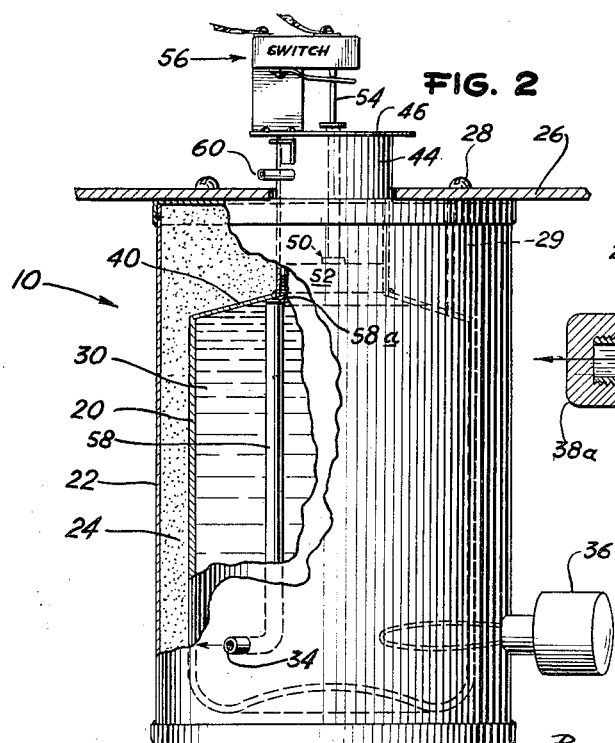
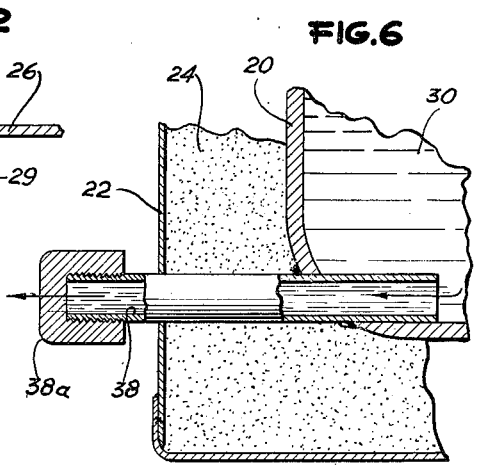
Inventor:
Alan M. King
By Hofgren, Wegner, Allen, Stellman & McCord
Attorneys July 6, 1965 A. M. KING 3,193,144
WATER HEATING TANK
Filed Aug. 14, 1963 2 Sheets-Sheet 2

United States Patent Office 3,193,144
Patented July 6, 1965

3,193,144
WATER HEATING TANK
Alan M. King, Lake Forest, Ill., assignor to Square Manufacturing Company, a corporation of Illinois
Filed Aug. 14, 1963, Ser. No. 302,199
4 Claims. (Cl. 222—67)

This invention relates to water heating tanks and more particularly to a nonpressurized water heating tank for use in a beverage dispenser or the like.

In the use of water heating tanks it is desirable that the evaporation of water therefrom be kept to a minimum so that the moisture laden air will not cause harm to adjacent articles. One method of solving this problem has been with the employment of pressurized water heating tanks. However, pressurized tanks are relatively expensive to manufacture. Thus it is desirable to provide a nonpressurized water heating tank provided with means for substantially eliminating the evaporation of water therefrom.

This type of tank is necessary for use in a machine such as a beverage dispenser adapted to brew and dispense beverages such as hot coffee and the like. Such machines have a plurality of electromechanical components which may malfunction or be rendered inoperative by the presence of excessive quantities of moisture in the machine. Also, the quantities of granules of beverage charge or beverage powder which are kept in the machine may tend to coagulate or lump if there is an excessive amount of moisture near. Thus it is not only desirable that the nonpressurized water heating tank have means for substantially eliminating the evaporation of water therefrom, but that it also be provided with means for conducting away any evaporating water to a nonheated receptacle where the evaporation, if any, would take place much more slowly than in a place where the water is being continually heated.

Thus the primary object of this invention is to provide a new and improved water heating tank.

It is another object of this invention to provide a new and improved water heating tank which is free from the objections mentioned above.

It is still another object of this invention to provide a new and impoved water heating tank having means for substantially eliminating the evaporation of water therefrom.

It is yet another object of this invention to provide a new and improved water heating tank having closed means for conducting away water which may evaporate therefrom.

It is a further object of this invention to provide a new and improved nonpressurized water heating tank having means for substantially eliminating the evaporation of water therein and having further means for conducting away any evaporating water through a closed passage means.

It is still a further object of this invention to provide a new and improved nonpressurized water heating tank having float means and a cover operatively associated for substantially covering the entire exposed surface area of the water in the tank, the float means being associated with a switch controlling means to maintain the water at a level wherein the float means may substantially cover the entire exposed surface area of the water.

Further objects and advantages will become apparent from the following detailed description taken in connection with the accompanying drawings, in which:

FIGURE 1 is a side elevational view in partial phantom outline showing a water heating tank of this invention in use in a coffee machine;

FIGURE 2 is an enlarged side elevational view in partial phantom outline and partially broken away in section of the water heating tank of this invention;

FIGURE 5 is a fragmentary view of the bottom portion of the water heating tank of this invention showing the position of the inlet and outlet and drain plugs; and FIGURE 6 is a fragmentary enlarged section view in detail of the lower portion of the water heating tank of this invention and the drain plug thereof.

Figure 4:
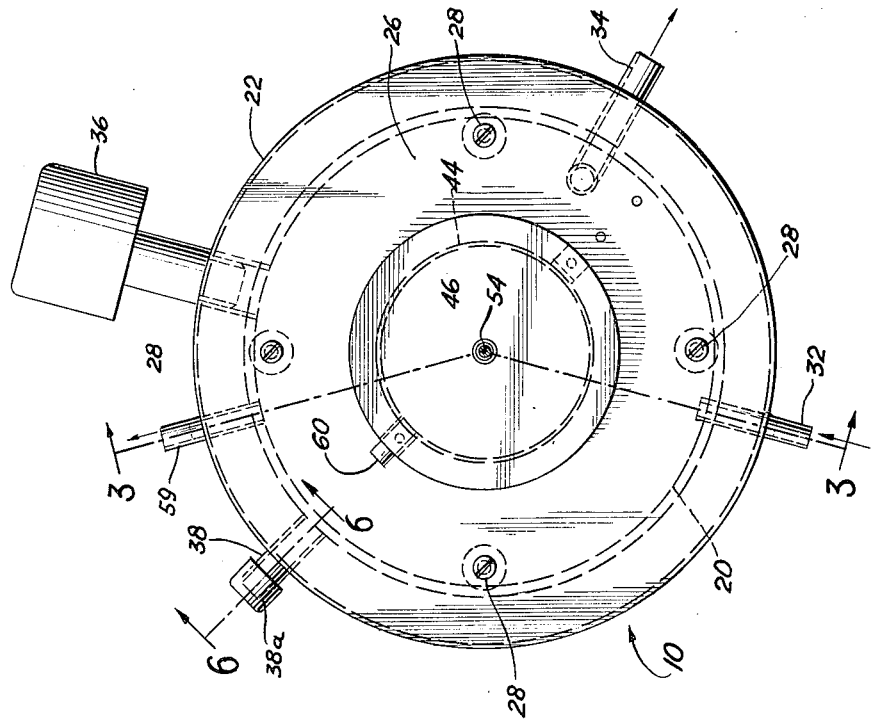
FIGURE 4 is a top plan view of the water heating tank of this invention.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

In FIGURE 1, the water heating tank 10 of this invention is shown in phantom outline positioned in a beverage dispenser 12 adapted to dispense a beverage 14 through an outlet 16 into a cup 18.

The tank 10 includes a generally circular cylindrical tank body 20 of an appropriate metallic or ceramic material for water heating tanks of this nature. The tank body 20 is housed in a generally circular cylindrical tank housing 22 and surrounded by insulation 24. The tank 10 is secured to a portion of the dispenser frame 26 by appropriate fasteners such as screws 28 which are threaded into mating taps 29 in the tank housing 22.

The tank 10 is adapted to store and heat water 30 therein which water may be pumped in by appropriate means through an inlet 32 and selectively withdrawn in response to suitable actuation from the beverage maker through an outlet 34. A thermostat and heating element 36 maintains the water in the tank within a given temperature range. A drain 38 having a drain cap 38a thereover is also provided for draining the tank body 20 when necessary.

The tank body has a substantially frusto-conical top 40 having an opening 42 centrally disposed therein. Projecting upwardly from the opening is a generally circular cylindrical neck 44 having a cover 46 thereover. A sleeve 48 centrally disposed in the cover forms a guide bushing for the float means 50. The float means 50 includes a float element 52 which has a diameter and exterior configuration substantially coextensive and mating with that of the interior of the neck 44 but allowing sufficient clearance for the float to easily move up and down therein, and an upstanding float shaft 54 which is guided in the sleeve 48.

Figure 3:
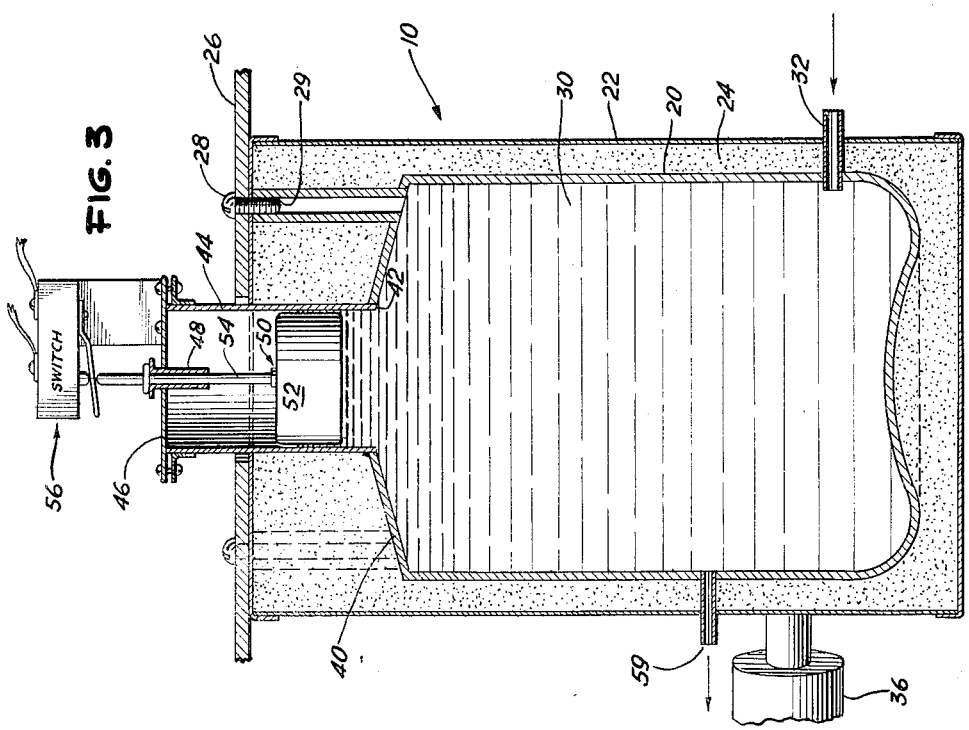
FIGURE 3 is an enlarged longitudinal section view of the water heating tank of this invention.

Mounted on the cover of the neck in a position to be operated by the float shaft 54 is a switch means 56 which is electrically connected with an appropriate water supply (not shown) for adding water to the tank in response to actuation by the float shaft 54. The length of the float shaft 54 is such that when the water level of the tank is at its normal position which is at an intermediate point in the neck and above the opening in the frusto-conical top, as shown in FIGURE 3, the switch remains closed. When the water is at the aforementioned level substantially none of the surface area of the water is exposed for the float occupies substantially the entire cross section of the neck. Since there is little exposed surface area the likelihood of evaporation, even when the water is heated is substantially eliminated.

It is further to be noted that the oulet 34 is the bottom end of a generally L-shaped outlet tube 58 which opens at 58a near the frusto-conical top at the highest portion thereof adjacent to the opening for the neck to obtain the hottest water for the preparation of coffee or the like. The volume of the tank can be so designed so that the amount of water carried between the high level, as shown in FIGURE 3, and the low level which is defined by the juncture of the neck and the frusto-conical top, is sufficient to prepare at least an individual serving of beverage. When the float lowers in response to the fall of the water level, the switch is activated and water is added until the level is raised to the aforementioned high mark. Since the water enters at the bottom of the tank and is withdrawn from the top, only the hottest water will be withdrawn from the tank.

A second outlet 59 may be provided at an intermediate level of the hot water tank for withdrawing relatively cooler water for the preparation of such beverages as hot chocolate, soup or the like. This outlet is generally adapted to permit flow of the hot water from the tank upon selective actuation of the beverage machine in a known fashion. It is to be understood that when the water heating tank is provided with this second outlet then the level thereof might be permitted to drop below the level of the opening of the tubes 58a. However, since the switch is immediately responsive to a drop in the water level, such a low level would be maintained for an extremely short period of time. As a new supply of water is introduced through the inlet 32, once again the water level and the float would be raised to the normal position and thereby maintain evaporation to a minimum.

The tank is further provided with an overflow tube 60 which extends out of one side of the neck and communicates with the interior thereof. The overflow tube 60 leads to a watse tank 61. The cover 46 is secured on the neck by fastening means such as screws and is not hermetically sealed thereon. Since the water heating tank is not a pressure vessel, should the overflow tube 60 clog for any reason, the excess steam or water pressure might be able to escape from the tank between the cover 46 and neck 44. The purpose of the tube is to carry away any overflow water through a closed conduit to a separate nonheated reservoir located remote from the electromechanical components and the beverage powders. Since the waste tank is not heated, very little, if any, evaporation of water will take place. Moreover, the reservoir may frequently be emptied or, if desired, may be a closed reservoir to even further reduce the possibility of the moisture entering the air. In actual practice, it has been found that a small amount of heated water in the tank which escapes through the overflow tube in the form of steam condenses in transit to the reservoir.

This invention provides a nonpressurized water heating tank which substantially eliminates the evaporation of water therefrom and furthermore is provided with a means for conducting away any possible evaporating water. Since this is a nonpressurized tank it is relatively inexpensive to produce and, being comprised of simple components, is extremely reliable in operation. Thus this nonpressurized water heating tank is particularly adapted for use in structures such as beverage dispensers wherein it eliminates the possibility of causing malfunctions or rendering inoperative the electromechanical components thereof, as well as the possibility of causing lumping or coagulation of the beverage charges or powders stored in the dispenser.

I claim:
1. A water heating tank for a beverage dispenser machine having granules of beverage charge therein and related electromechanical components for preparing a preselected beverage, comprising: a tank body having means therein defining an inlet and outlet and means for heating the water contained therein; a frusto-conical top on said body having an opening therein and a neck projecting upwardly therefrom; an outlet tube having an opening immediately adjacent said top; a cover on said neck having a sleeve therethrough; float means in said neck adapted to rise and fall in response to the different water levels in the tank, said float means including a float element having a diameter substantially coextensive with that of said neck and a shaft positioned in said sleeve; switch means on said neck operatively associated with said float means shaft for admitting water to said tank when said water level and said float fall below a predetermined line of said neck the position of said outlet opening relative to said top permitting exposure of only a minimal amount of water surface area when water is drawn from said tank through said outlet, so that the exposed surface area of water subject to evaporation is maintained at a minimum and thereby fouling of said electromechanical components or coagulation of said granules due to the moisture in the dispenser is substantially eliminated.

2. The water heating tank of claim 1 including a conduit opening in said neck above said float for carrying away evaporated water from said tank.

3. A water heating tank, comprising: a tank body having means therein defining an inlet and an outlet and means for heating the water contained therein; a generally wide angle frusto-conical top on said body having an opening therein and a neck projecting upwardly therefrom; an outlet tube having its opening positioned immediately below said top and closely laterally spaced from said neck; a cover on said neck having a sleeve therethrough; float means in said neck adapted to rise and fall in response to the different water level in the tank, said float means including a float element having a diameter substantially coextensive with that of said neck and a shaft positioned in said sleeve; switch means on said neck operatively associated with said float means shaft for admitting water to said tank when said water level and float fall below a predetermined line of said neck, the neck, the position of said outlet opening relative to said top and said neck permitting exposure of only a minimal amount of water surface area when water is drawn from said tank through said outlet, so that the exposed surface area of said water subject to evaporation is maintained at a minimum.

4. The water heating tank of claim 3 wherein a closed conduit is provided which opens to the interior of said neck above said float and communicates with a closed reservoir for carrying away evaporating water from said tank through a closed system.

References Cited by the Examiner

UNITED STATES PATENTS 3,059,586   10/62   Brailsford _____ 222—67 X
3,082,915   3/63    Karlen et al. _____ 222—146

LOUIS J. DEMBO, *Primary Examiner.*

HADD S. LANE, *Examiner.*